(12) United States Patent
Lam et al.

(10) Patent No.: US 6,888,943 B1
(45) Date of Patent: May 3, 2005

(54) MULTIMEDIA ADAPTIVE SCRAMBLING SYSTEM (MASS)

(75) Inventors: Katherine S. Lam, San Diego, CA (US); Kamran Moallemi, Del Mar, CA (US); Chong U. Lee, San Diego, CA (US); Taku Katoh, Kanagawa (JP); Naoki Endoh, Tokyo (JP)

(73) Assignee: Verance Corporation, San Diego, CA (US)

( * ) Notice: Subject to any disclaimer, the term of this patent is extended or adjusted under 35 U.S.C. 154(b) by 556 days.

(21) Appl. No.: 09/692,084

(22) Filed: Oct. 19, 2000

Related U.S. Application Data

(63) Continuation of application No. PCT/US99/08635, filed on Apr. 20, 1999.
(60) Provisional application No. 60/082,488, filed on Apr. 21, 1998.

(51) Int. Cl.$^7$ .......................... H04L 9/00; H04N 7/167; H03K 17/92
(52) U.S. Cl. ....................... 380/268; 380/217; 380/213; 380/210; 380/215; 327/371
(58) Field of Search ................................ 380/268, 217, 380/213, 210, 215; 327/371

(56) References Cited

U.S. PATENT DOCUMENTS

| | | | | |
|---|---|---|---|---|
| 3,784,743 A | * | 1/1974 | Schroeder | 380/46 |
| 5,185,794 A | * | 2/1993 | Thompson et al. | 380/235 |
| 5,535,275 A | * | 7/1996 | Sugisaki et al. | 380/203 |
| 5,706,346 A | * | 1/1998 | Katta et al. | 380/217 |
| 5,774,548 A | * | 6/1998 | Bando et al. | 380/212 |

OTHER PUBLICATIONS

Pohlmann, Ken C., "Buried Data Technique," *Principles of Digital Audio*, McGraw–Hill, Inc., 3$^{rd}$ edition—1995, pp. 569–571.

Eastty, Peter, "An Inaudible Buried Data Channel in Digital Audio: A Development Using Advanced Software Tools," Presented at the 101$^{st}$ AES Convention, Nov. 1996.

* cited by examiner

Primary Examiner—Gilberto Barrón
Assistant Examiner—Benjamin E. Lanier
(74) Attorney, Agent, or Firm—Barry R. Lipsitz; Douglas M. McAllister

(57) ABSTRACT

A system (300, 500) for scrambling digital samples (115, 200, 250, 260, 270) of multimedia data, including audio and video data samples, such that the content of the samples is degraded but still recognizable, or otherwise provided at a desired quality level. The samples may be in any conceivable compressed or uncompressed digital format, including Pulse Code Modulation (PCM) samples, samples in floating point representation, samples in companding schemes (e.g., $\mu$-law and A-law), and other compressed bit streams. The quality level may be associated with a particular signal to noise ratio, or quality level that is determined by objective and/or subjective tests, for example. A number of LSBs can be scrambled in successive samples in successive frames (FRAME A, FRAME B, FRAME C). Moreover, the parameters for scrambling may change from frame to frame. Furthermore, all or part of the scrambling key (310) can be embedded (340) in the scrambled data and recovered at a decoder (400, 600) to be used in descrambling. After descrambling, the scramble key is no longer recoverable because the scramble key itself is scrambled by the descrambler.

22 Claims, 7 Drawing Sheets

SAMPLE 1
(ORIGINAL)

SAMPLE 1
(AFTER INTRA-SAMPLE SCRAMBLING)

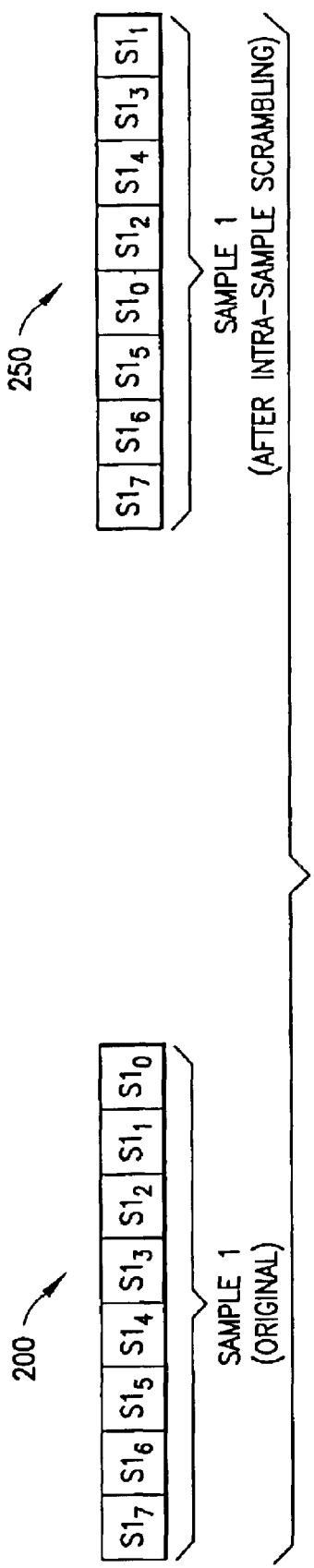
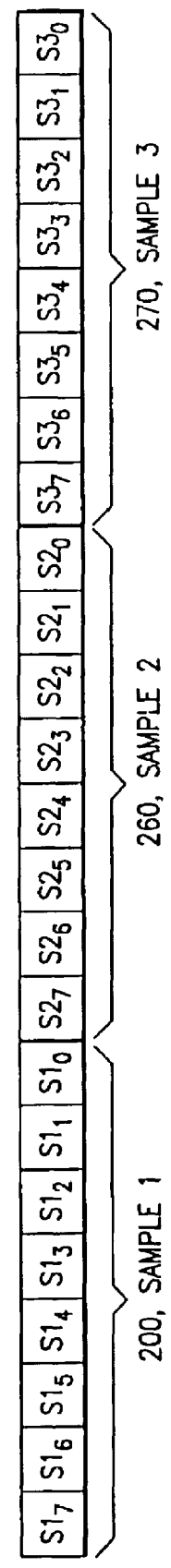
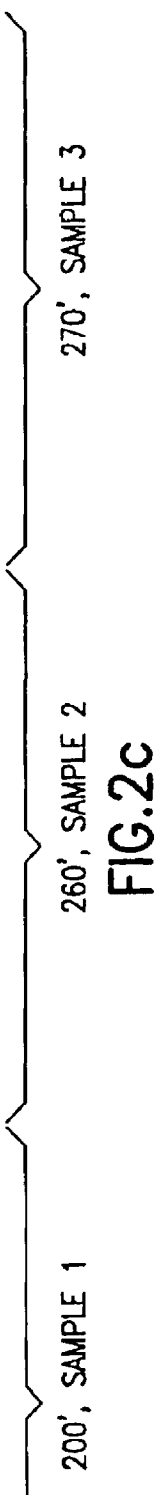
FIG.2a
FIG.2b
FIG.2c

US 6,888,943 B1

MULTIMEDIA ADAPTIVE SCRAMBLING SYSTEM (MASS)

This application is a continuation of PCT/US99/08635 filed Apr. 20, 1999.

This application claims the benefit of U.S. Provisional Application No. 60/082,488, filed Apr. 21, 1998.

BACKGROUND OF THE INVENTION

The present invention relates to a method and apparatus for scrambling digital samples of multimedia data, e.g., such as audio or video data samples, such that the content of the samples is degraded but still recognizable. For example, the invention is suitable for use with digital broadcast streams and digital storage media, such as compact discs (CDs) and digital video discs (DVDs). The number of least significant bits (LSBs) scrambled in each sample is selected such that the scrambled samples are degraded but still recognizable.

Schemes for communicating and storing digital data have become increasingly popular, particularly in the mass consumer market for digital audio, video, and other data. Consumers may now send, receive, store, and manipulate digital television, audio and other data content, such as computer games and other software, stock ticker data, weather data and the like. This trend is expected to continue with the integration of telephone, television and computer network resources.

However, in many cases it is desirable to control or monitor the use of such digital data. In particular, copyright holders and other proprietary interests have the right to control the distribution and use of their works, including audio, video and literary works.

In a copyright management system where audio and video content are to be protected, it would be desirable to provide data scrambling to deter theft of the content while it is in transit. The distance of transit can be half way around the world, as with delivery on the Internet, or millimeters, such as within a DVD player's internal data transfer from disc to DAC (Digital to Analog Converter).

It would be desirable to provide a method and apparatus that renders the audio/video content unsuitable for listening/viewing purpose but sufficient for identification of an audio/video passage, e.g., during fast forward playback, when there is insufficient time to descramble the samples.

It would be desirable to scramble bits in successive frames of digital data samples according to a scrambling key, where the scrambling key is embedded into the scrambled signal.

It would be desirable for the scrambling key to be associated with the scrambled data to allow the scrambling key to be easily changed without modifying the player (e.g., DVD or CD player) on which the data is played.

It would be desirable to scramble data such that the content is degraded sufficiently so that it no longer has any significant commercial value, but, at the same time, is perceptually satisfactory for player functions such as cueing and fast forward.

The scrambled data should not damage the video or audio equipment even if it is played through any video or audio playback system. Some randomly scrambled waveforms can result in such damage, e.g., to speakers or circuitry.

It would further be desirable for the scrambled data to be any conceivable digital data.

It would be desirable for the data to be scrambled at any time, including, for example, when the data signal is created (e.g., during a recording session for an audio track), when the data signal is being distributed (e.g., during a broadcast, or during manufacture of storage media such as compact discs), or when the data is being played (e.g., on a player in a consumer's home).

The present invention provides a system having the above and other advantages.

SUMMARY OF THE INVENTION

A method for protecting digital samples of content from illicit use by scrambling the content is provided, wherein each sample includes a plurality of bits, ranging from least significant bits (LSBs) to most significant bits. The method includes the step of scrambling a number of LSBs in each sample according to a scrambling key, while preserving a number of MSBs in each sample, to provide corresponding scrambled samples. The number of LSBs scrambled in each sample is provided such that the scrambled samples are degraded but still recognizable.

The number of LSBs to be scrambled in each sample may be adaptively determined according to the dynamic range of the sample.

Alternatively, or in addition, the number of LSBs to be scrambled in each sample may be adaptively determined according to the particular frame a sample is in, where different frames can have a different number of LSBs scrambled.

The scrambling key may be a pseudo-random scrambling key, for example.

The LSBs may be scrambled within the same sample using intra-sample scrambling.

Alternatively, or in addition, the LSBs may be scrambled between different samples using inter-sample scrambling.

A particular type of inter-sample scrambling is horizontal inter-sample scrambling, where bits having the same weight are interchanged between samples.

The scrambling key may be embedded into the scrambled samples for use at a decoder in descrambling the scrambled samples.

In particular, the scrambling key for a current frame of scrambled samples may be embedded into a previous frame of samples. This avoids a delay in recovering the key at the decoder.

A corresponding descrambling method, and corresponding apparatuses are also presented.

BRIEF DESCRIPTION OF THE DRAWINGS

FIG. 2(a) illustrates intra-sample scrambling in accordance with the present invention.

FIG. 2(b) illustrates original, unscrambled samples.

FIG. 2(c) illustrates the samples of FIG. 2(b) after horizontal, inter-sample scrambling in accordance with the present invention.

DETAILED DESCRIPTION OF THE INVENTION

The present invention relates to a method and apparatus for scrambling digital samples of multimedia data.

This subject matter discussed in the following patents and patent applications, each of which is incorporated herein by reference, may be adapted for use with the present invention: U.S. Pat. No. 5,822,360, entitled "Method and Apparatus for Transporting Auxiliary Data in Audio Signals"; application Ser. No. 08/764,096, filed Dec. 6, 1996 entitled "Method and Apparatus for Embedding Auxiliary Data in a Primary Data Signal"; U.S. Pat. No. 5,687,191, entitled "Post Compression Hidden Data Transport"; application Ser. No. 08/912,434, filed Aug. 18, 1997, entitled "Post Compression Hidden Data Transport for Video"; U.S. Pat. No. 5,719,937, entitled "Multi-Media Copy Management System"; application Ser. No. 08/977,719, filed Nov. 25, 1997, entitled "Multi-Media Copy Management System", and application Ser. No. 09/708,810, filed Nov. 8, 2000, entitled "Digital Hidden Data Transport". Similar systems for providing embedded information may also be adapted for use with the present invention.

Audio, video or other digital content is scrambled to degrade its quality, but still allow a listener, viewer, or other user to recognize the content.

Selective scrambling of a content waveform consists of preservation of some of the MSBs (up to and including the sign bit) and scrambling of some or all of the remaining LSBs. The scrambling noise is maintained at a desired level compared to the original data (e.g., audio, video or other data).

Each data sample's M most significant bits are dynamically preserved. The number M can be chosen before processing begins as a preset parameter, or can vary during processing.

Figure 1:
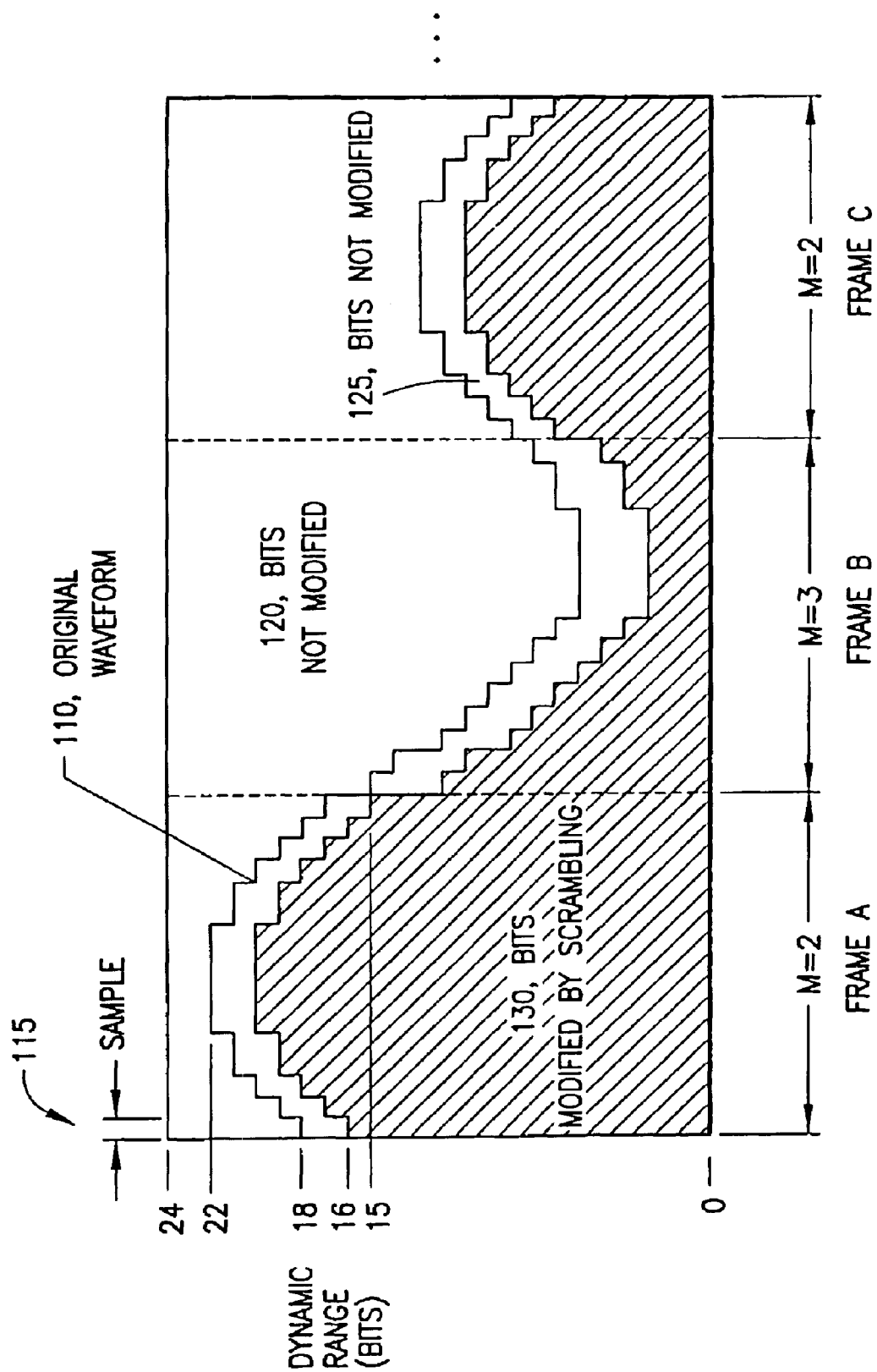
FIG. 1 illustrates adaptive bit modification for successive data samples in successive data frames in accordance with the present invention.

Dynamic preservation of MSBs involves performing amplitude range detection on each sample and preserving (or masking) M of the most significant bits within the range of the sample, as shown in FIG. 1. M may vary from 0 to the full dynamic range of the digitized samples.

M is the number of bits preserved in each sample's dynamic range and can be varied (for example, frame to frame) during processing. Moreover, as discussed further below, M can be part of the information embedded in the content material for the decoder to use.

The digital content samples may be in any conceivable compressed or uncompressed digital format, including Pulse Code Modulation (PCM) samples, samples in floating point representation, samples in companding schemes (e.g., $\mu$-law and A-law), and other compressed bit streams as described below.

Most of the prevailing compression systems, for audio or video or images, tend to use frequency domain techniques to reduce the perceptually redundant information from the signal being compressed. Therefore, a majority of the compressed bit streams can be parsed and decoded into a set of parameters that include a set of frequency samples or transform coefficients. Examples are subband samples in MPEG audio coding, TDAC transform coefficients in AC-3 or AAC audio coding, and DCT coefficients in JPEG and MPEG image and video coding. These representations can be generalized as "frequency samples".

In a generalized compression scheme, a group of uncompressed signal samples are represented by a group of frequency samples, which are quantized according to the perceptual criteria for efficient is storage and transmission. The ratio between the number of frequency samples required to represent the number of signal samples are usually fixed, e.g., at one. However, the number of frequency samples actually selected for transmission may be less, since some of the perceptually unimportant frequency samples are often not transmitted. This can be determined by extracting the bit allocation information contained in the compressed bit stream.

The frequency samples that are not transmitted usually have zero bits allocated, or otherwise indicated as zeros (e.g., a run length is indicated for a series of zeros). In essence, from the compressed bit stream, a binary representation of the frequency samples can be extracted with an augmentation information that indicates the number of bits allocated, dynamic range of the frequency sample, or the scale factor needed to restore the frequency sample to it full value.

Once the binary representation of the frequency samples are extracted, the process of partial scrambling is no different than the process that applies to the uncompressed domain signal samples, e.g., as with a PCM representation.

FIG. 1 illustrates adaptive bit modification for successive data samples in successive data frames in accordance with the present invention.

Samples of digital data are selectively scrambled such that some of the Most Significant Bits (MSBs) are preserved, and some or all of the remaining data bits (e.g., LSBs) are scrambled. In addition, the key to unscramble the data can be concealed into the scrambled signal (e.g., using the techniques discussed in the aforementioned patents and applications) so that the key is no longer decodable once the content data is unscrambled.

In FIG. 1, the horizontal axis designates successive frames and samples of digital data. In this example, three frames are shown (FRAME A, FRAME B and FRAME C), each frame has fifteen samples, and each sample has twenty-four bits, although the present invention can accommodate any variation of these parameters. Each sample has a dynamic range between zero to twenty-four bits which is defined by the most significant non-zero bit, not including a sign bit, which may be the leftmost bit in each sample.

An original waveform 110 designates the dynamic range of each sample prior to scrambling in accordance with the present invention. Regions 120 and 125 designate the bits in each sample which are not modified, while a region 130 designates the bits in each sample which may be scrambled in accordance with the present invention.

For example, the first sample 115 of FRAME A has a dynamic range of 18 bits. An example of such a sample might be: $0_{23}0_{22}0_{21}0_{20}0_{19}0_{18}0_{17}0_{16}0_{15}0_{14}0_{13}0_{12}0_{11}0_{10}0_{9}0_{8}0_{7}0_{6}0_{5}0_{4}0_{3}0_{2}0_{1}0_{0}$, where the subscripts denotes the bit position, ranging from bit0 ($0_0$) for the LSB to bit17 (b $1_{17}$) for the MSB.

As shown by the region 125 which extends across FRAMES A, B and C, the number of MSBs which are not modified (e.g., preserved) for each frame may vary with each frame. For example, for FRAME A, M=2 MSBs are not modified, for FRAME B, M=3 MSBs are not modified, and for FRAME C, M=2 MSBs are not modified. The number of bits that are not modified in each frame may therefore be adaptive. In particular, the number of bits which are not modified may be inversely proportional to the maximum dynamic range of the frame. For example, for FRAME A, the maximum dynamic range is 22 bits, and M=2, while for FRAME B, the maximum dynamic range is only 15 bits, and M=3.

It is also possible to set M to a constant for each frame for simplicity.

Generally, the specific number of bits which are not modified can be selected by experimentation to yield data with a desired level of degradation.

The bits in the region 130 are subject to scrambling as discussed in greater detail below.

Perceptually, the selectively scrambled samples appear noisy. For example, audio samples will sound noisy to the listener, e.g., when played on a player in the user's home. Generally, the samples will sound noisier for samples where fewer MSBs are preserved, although the perception of the noise can vary based on the dynamic range of the each sample as well as the neighboring samples, the type of audio being played, the listening environment and other factors.

The noise is generally not objectionable for player functions such as cueing and fast forward playback. During fast forward playback (or fast reverse, if provided), there is insufficient time for the player to descramble the samples. During normal playback, the player has sufficient time to descramble the samples, so the content is heard or seen with its full dynamic range.

In accordance with the present invention, instead of scrambling the content over its entire dynamic range, a portion of the range is preserved so that the content is degraded but still recognizable, e.g., during fast forward playback. This allows the user to conveniently fast forward through audio or video content to locate a precise segment of interest.

Furthermore, the selectively scrambled content material limits the amplitude of the scrambled waveform such that it does not exceed the dynamic range of the original waveform. Thus, unlike a randomly scrambled waveform, the scrambled content does not damage the video or audio equipment even if it is played through any video or audio playback system.

Scrambling of the data bits can be done within each sample (intra-sample scrambling) or within a group of samples (inter-sample scrambling). Furthermore, a combination of intra-sample and inter-sample scrambling can be used.

Scrambling may take the form of interchanging the position of the data bits (inter-sample scrambling), masking the data bits with a sequence derived from the scramble key or parts of a scramble key (intra-sample scrambling), or combinations thereof. The purpose is to randomize or whiten the statistics of the scrambled data bits to make it "look" more random. The descrambler must undo this mapping of the bits.

Random or pseudo-random scrambling improves the security of the scrambled data since it will be more difficult for an attacker to detect patterns in the scrambled data.

FIG. 2(a) illustrates intra-sample scrambling in accordance with the present invention. An original sample 200 includes bits $S1_7S1_6S1_5S1_4S1_3S1_2S1_1S1_0$, where "S1" denotes "sample 1". For simplicity, the sample is shown having only eight bits, although any number of bits may be used for each sample. Additionally, assume M=3, which means the three MSBs (i.e., $S1_7S1_6S1_5$) are not modified, but the remaining bits (i.e., $S1_4S1_3S1_2S1_1S1_0$) are. $S1_7$ is assumed to be the MSB of the sample. After intra-sampling scrambling, the modified sample 250 may be obtained, which includes bits $S1_7S1_6S1_5S1_0S1_2S1_4S1_3S1_1$. The modified bits may be scrambled using any known scrambling technique.

FIG. 2(b) illustrates original, unscrambled samples. Like-numbered elements correspond to one another in the figures. Sample 1 (200), Sample 2 (260), and Sample 3 (270) are shown. FIG. 2(c) illustrates the samples of FIG. 2(b) after horizontal, inter-sample scrambling in accordance with the present invention. Samples 1 (200'), 2 (260') and 3 (270') correspond to Samples 1 (200), 2 (260) and 3 (270), respectively.

For inter-sample scrambling, the waveform samples are grouped into frames. Each frame is associated with a scramble key, such as a pseudo-random key. The scramble key can be different for each frame and is determined at encoding time. A particularly useful case of inter-sample scrambling is horizontal scrambling, where the bits with the same weight are interchanged among the samples.

For example, bit $S1_0$ replaces bit $S3_0$, bit $S1_1$ replaces bit $S3_1$, bit $S1_2$ replaces bit $S2_2$, and so forth.

Note that it is also possible to use non-horizontal scrambling, wherein the weight of the scrambled bits is not maintained.

Figure 3:
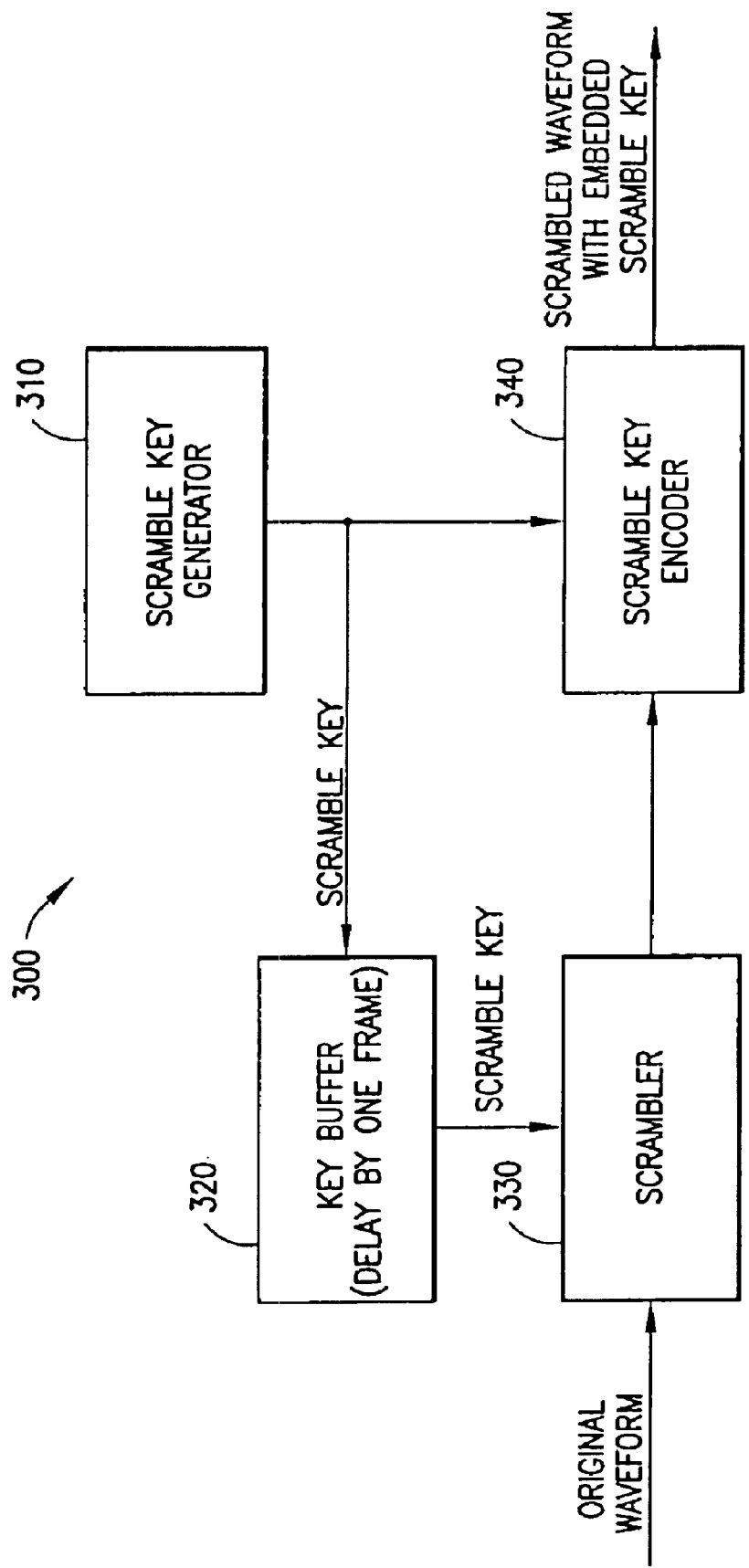
FIG. 3 illustrates a data scrambler and scramble key encoder in accordance with the present invention.

FIG. 3 illustrates a data scrambler and scramble key encoder in accordance with the present invention. In one possible implementation, the scramble key is embedded into a scrambled audio content.

A major advantage of using partially scrambled samples is that all or part of a key to descramble the samples can be concealed within the scrambled samples themselves. This is important because the scramble key is protected before and after descrambling.

The scrambler/encoder 300 includes a scramble key generator 310 for generating a scramble key.

The scramble key does not have to be the same length as the sample length. A longer scramble key length makes the data more secure.

The scramble key is provided to a key buffer 320, which stores the key, e.g., for one frame. In this manner, the key for scrambling a current frame is carried in the previous frame. After a one (or more) frame delay, the scramble key is provided to a scrambler for scrambling the samples in the original waveform, e.g., as discussed in connection with FIGS. 2(a)–(c). Generally, the same scramble key may be used to scramble a number of samples in a frame.

The scrambled waveform is provided to a scramble key encoder 340 to encode the scramble key into the waveform, thereby providing the scrambled waveform with the embedded scramble key. For example, the scramble key may be encoded as auxiliary data in the waveform using the techniques discussed in the aforementioned U.S. patents and applications.

The scramble key is concealed by the noise-like scrambled content.

Figure 4:
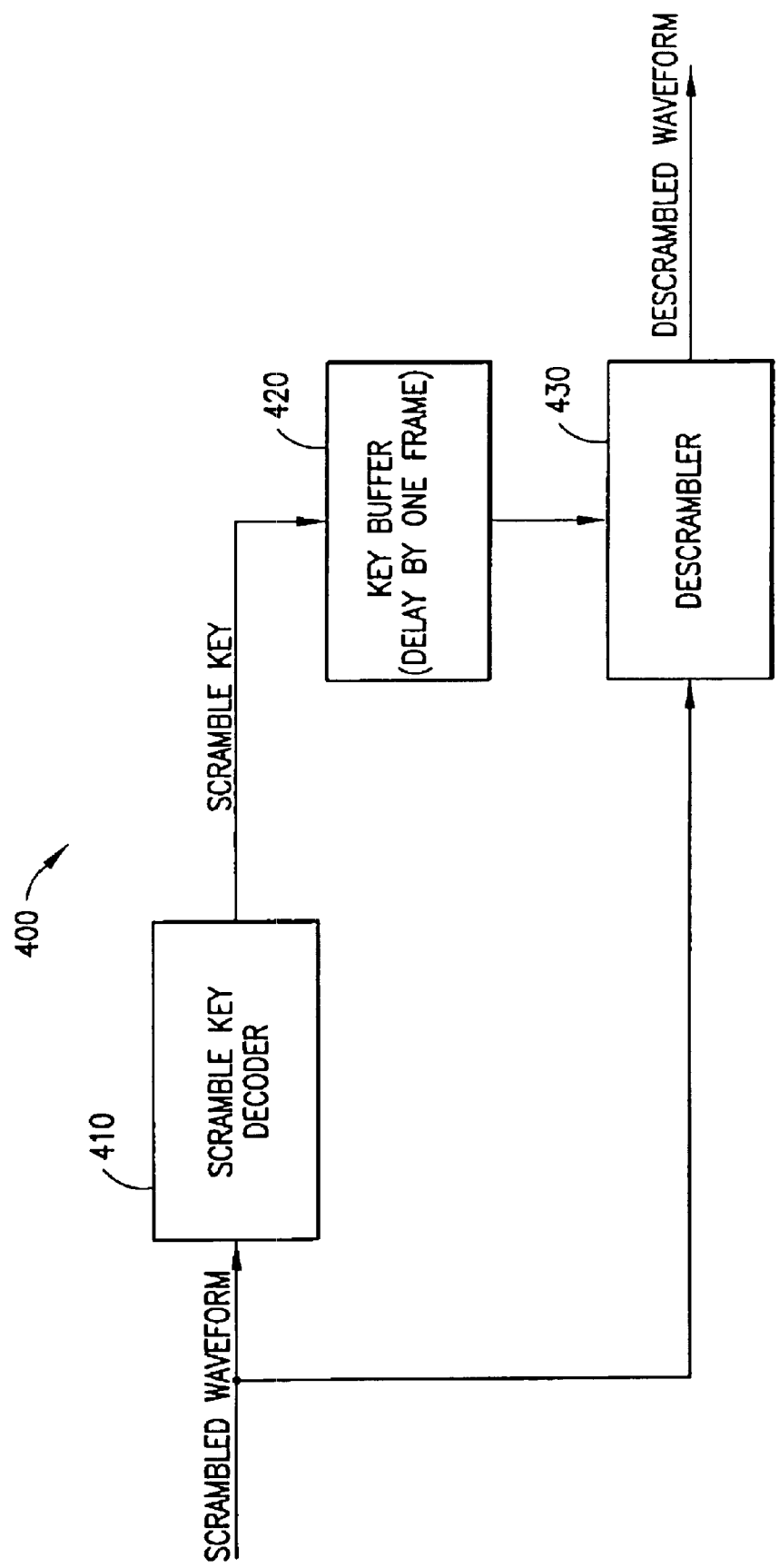
FIG. 4 illustrates a data descrambler and scramble key decoder in accordance with the present invention.

FIG. 4 illustrates a data descrambler and scramble key decoder in accordance with the present invention. A descrambler/decoder 400 includes a scramble key decoder 410 that receives the scrambled waveform, e.g., from the scrambler/encoder 300 of FIG. 3. The scrambled waveform may be communicated via any communication channel, and/or recovered from a storage medium, for example.

The scramble key decoder 410 recovers the scramble key that was used to scramble the following frame and stores it in a key buffer 420. The scramble key decoder 410 operates using the corresponding technique used by the scramble key encoder 340.

The scramble key is retrieved from the buffer 420 for use by a descrambler 430 in descrambling the current frame of samples to provide the descrambled waveform. The descrambled waveform may undergo subsequent processing, such as digital-to-analog conversion, e.g., for viewing or listening by a user.

Advantageously, after descrambling, the scramble key is no longer recoverable even by an attacker who has the scramble key decoder 410 because the scramble key is scrambled by the descrambler 430.

Figure 5:
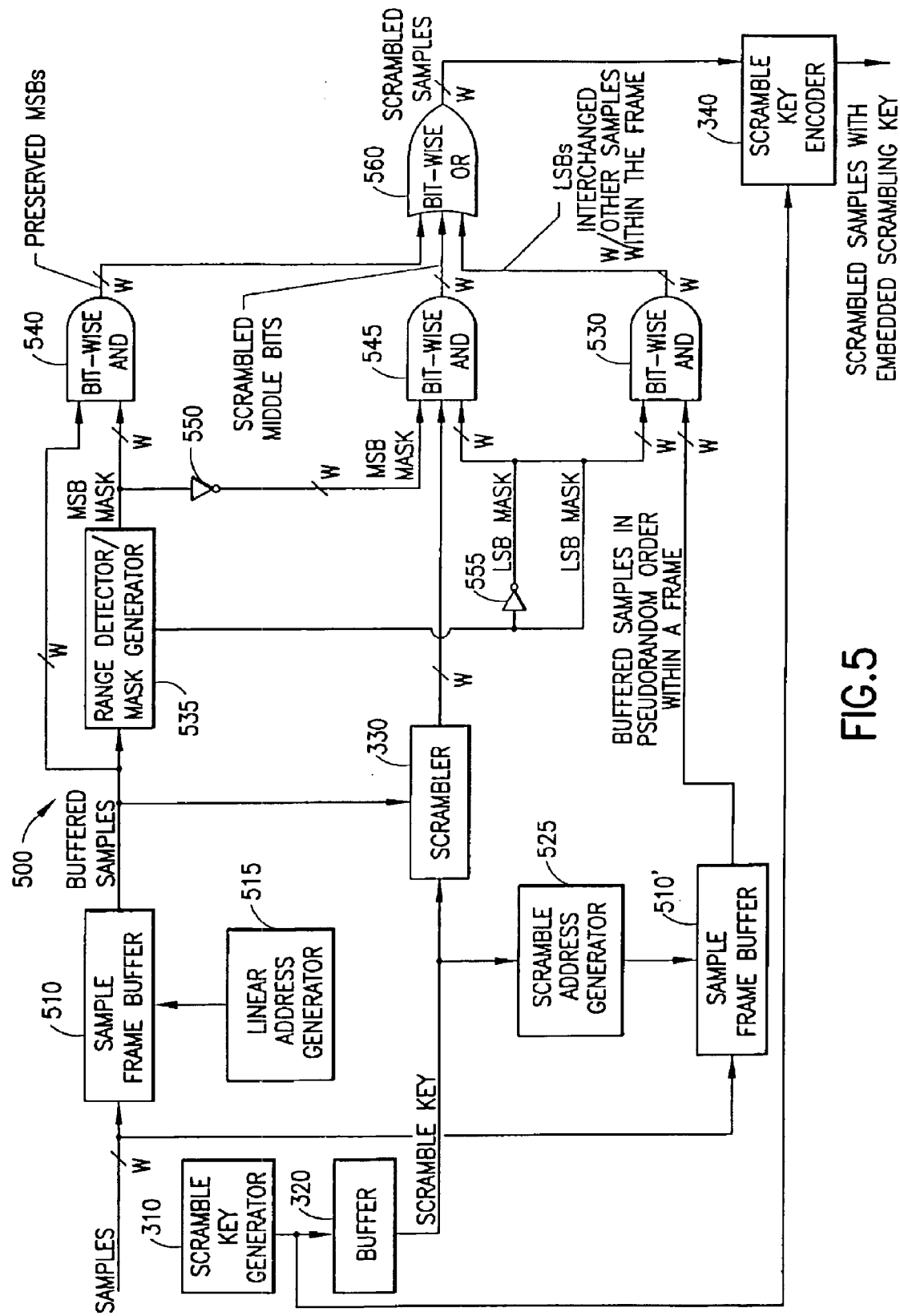
FIG. 5 illustrates a detailed data scrambler in accordance with the present invention.

FIG. 5 illustrates a detailed data scrambler in accordance with the present invention. In the scrambler 500, successive samples, each having W bits (sample width), are provided to sample frame buffers 510 and 510'. Non-scrambled buffered samples are output from the sample frame buffer 510 according to a linear address generator 515 for scrambling at a scrambler 330 according to a scrambling key.

Buffered samples in a pseudo-random order within a frame are output from the sample frame buffer 510' according to addresses from a scramble address generator 525, which receives the scramble key. The buffered samples are bit-wise ANDed at an AND function 530 with a mask bit string for the LSBs (LSB_MASK) to produce LSBs that are interchanged with other samples within the current frame. LSB_MASK is a bit string with 1's corresponding to the LSBs to be scrambled in the buffered samples, and 0's for the other bits in the buffered samples.

A range detector and mask generator function 535 provides LSB_MASK, along with a mask bit string for the MSBs which are to be preserved (i.e., not scrambled), MSB_MASK. MSB_MASK is a bit string with 1's corresponding to the MSBs to be preserved in the buffered samples, and 0's for the other bits in the buffered samples.

MSB_MASK is bit-wise ANDed with the buffered samples from the sample frame buffer 510 at an AND function 540 to produce the preserved MSBs.

Scrambled samples from the scrambler 330 are bit wise ANDed at an AND function 545 with MSB_MASK/(the inverse of MSB_MASK) and LSB_MASK/ (the inverse of LSB_MASK). MSB_MASK/ and LSB_MASK/ are obtained from the inverters 550 and 555, respectively. The output of the AND function 545 comprising the scrambled middle bits is provided to a bit-wise OR function 560 for combining with the preserved MSBs and the LSBs that are interchanged with other samples in a frame.

The output of the OR function 560 comprises the scrambled samples, which may be provided to the scramble key encoder 340 to provide scrambled samples with the embedded scrambling key. The samples are now ready, e.g., for transmission across a network, or storage on a storage medium.

The scrambled key may be embedded in the scrambled samples by providing a scramble key encoder (such as element 340 in FIG. 3). Note that the embedding of the scrambling key is optional.

As shown in FIG. 5, one method to selectively scramble the audio (e.g., so that it is sufficient for identification of music passage but lacks commercial value for music enjoyment) is to preserve the sign bit and, e.g., two most significant bits of each sample. Amplitude range detection is performed on each audio sample. A mask is generated for each sample corresponding to the amplitude range of that particular sample. Examples of samples quantized to 16-bits in 2's complement format and corresponding masks are shown below:

| Example Sample Value in Hexadecimal | Example Sample Value In Binary | Mask for sign bit + two MSBs In Hexadecimal (MSB_MASK) | Mask for sign bit + two MSBs in Binary (MSB_MASK) |
|---|---|---|---|
| 0x0b1f | 0000101100011111 | 0xfc00 | 1111110000000000 |
| 0xff98 | 1111111110011000 | 0xffe0 | 1111111111100000 |

Each sample has sixteen bits, where the leftmost bit is a sign bit. For example, for the sample value, 0xff98 in hexadecimal, or 1111111110011000 in binary, bit15 ("1") indicates that this is a negative number, i.e., negative 0x61, or −97 in decimal. Thus, the dynamic range is seven bits (bit0 to bit6).

In one example implementation of the scrambler 500, the remaining bits are separated into two groups—the least significant bit, and all other remaining bits. The least significant bit is scrambled horizontally by exchanging positions within a frame. Inter-frame scrambling may also be used. The other remaining bits are scrambled by XORing with a bit pattern which is generated from all or part of the scramble key. A linear shift register can be used to vary the bit pattern for each sample.

The scrambled output consists of 1) the preserved MSBs, 2) the intra-sample scrambled middle bits, and 3) the horizontal inter-sample scrambled LSBs.

Figure 6:
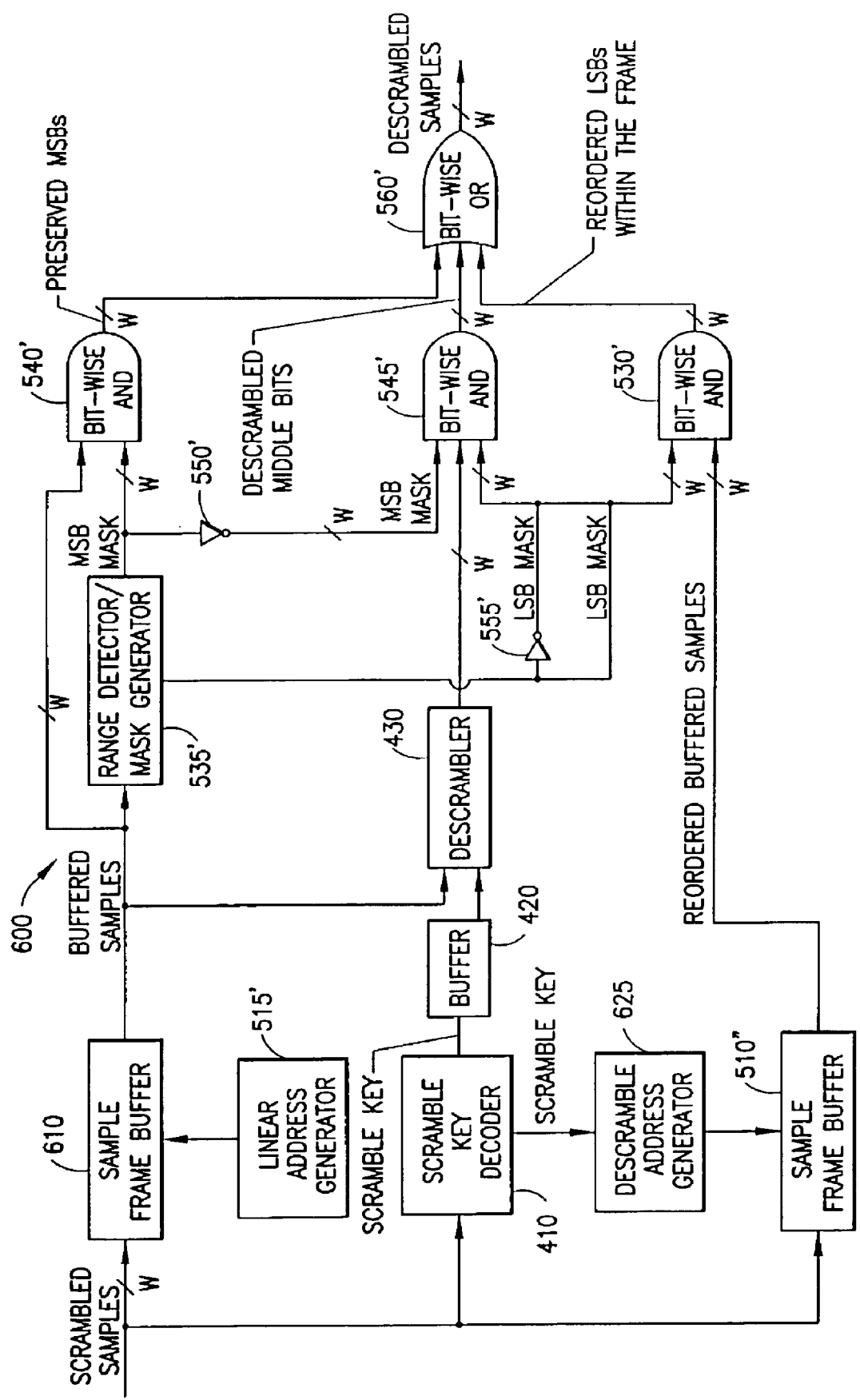
FIG. 6 illustrates a detailed data descrambler in accordance with the present invention.

FIG. 6 illustrates a detailed data descrambler 600 in accordance with the present invention. The descrambler may be used for processing data received from the scrambler 500, for example.

Elements 610, 510", 515', 530' 535', 540', 545', 550', 555' and 560' correspond to elements 510, 510', 515, 530, 535, 540, 545, 550, 555 and 560, respectively in FIG. 5.

As shown in FIG. 6, the scramble key is decoded from the scrambled samples at the scramble key decoder 410, and provided to a buffer 420, and then to the descrambler 430. A linear address generator 515' is used, if necessary, for providing an address to a sample frame buffer 610 to restore the bit pattern for each received sample.

The received, scrambled samples are provided from the sample frame buffer 610 to the range detect/mask generator function 535'. The preserved MSBs in each sample are identified the same way as at the scrambler, by using amplitude range detection. The descrambled middle bits in each sample are combined at the OR function 560' with the preserved MSBs and the reordered LSBs.

The inverse MSB mask (MSB_MASK/) is provided at the output of an inverter 550' to an AND function 545' for ANDing with the descrambled samples. The output of the AND function 545' is provided to the OR function 560' for ORing with the preserved. MSBs and the reordered LSBs within a frame.

The reordered LSBs within a frame are derived from ORing LSB_MASK with the reordered buffered samples, which are derived from the sample frame buffer 510" in response to addresses from a descramble address generator 625.

At the output of the AND function 530', the LSB's position in a frame is restored, and the descrambled output is obtained by combining the three components at the OR 560'.

Figure 7:
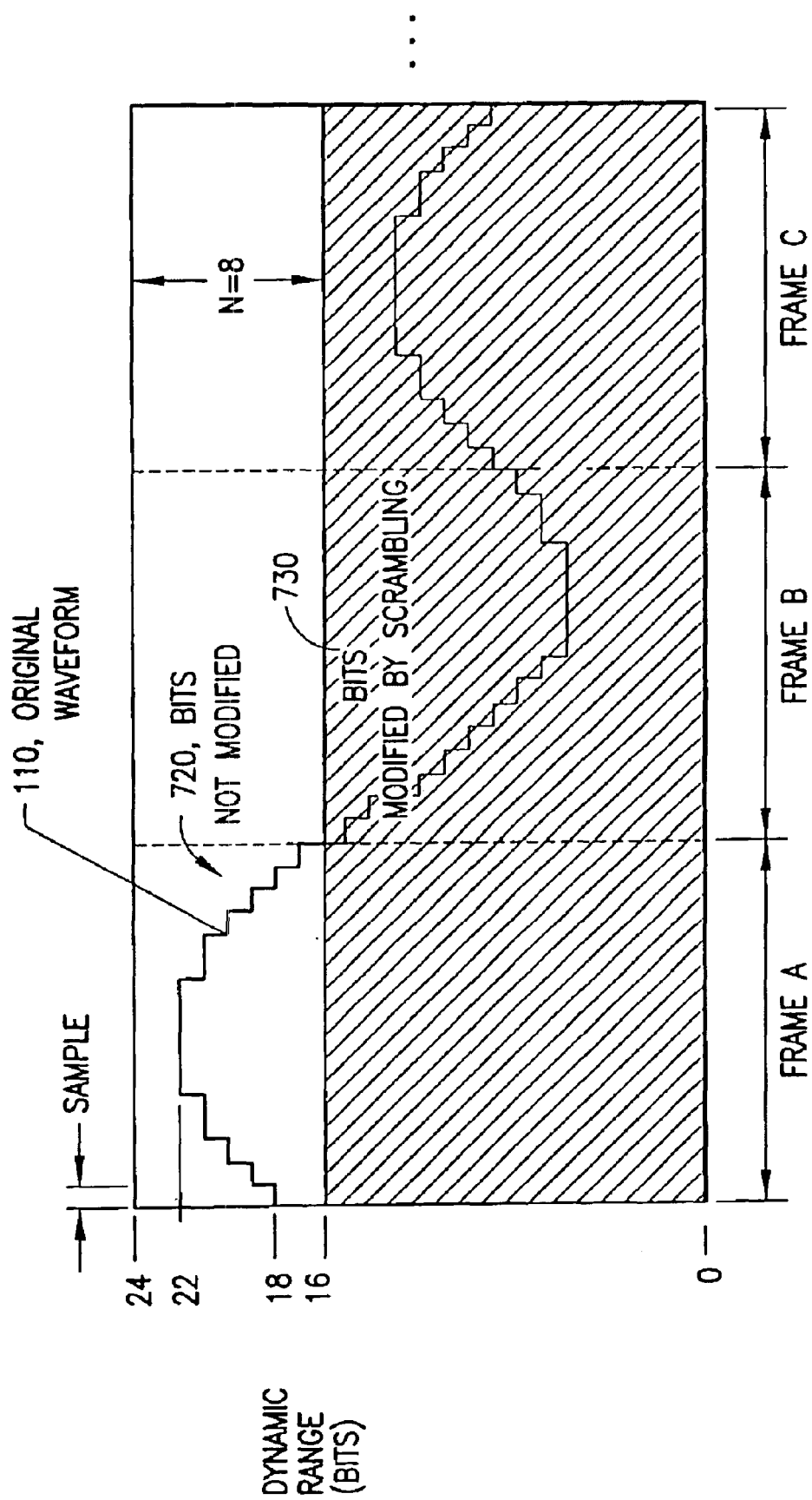
FIG. 7 illustrates adaptive bit modification with a fixed minimum dynamic range for successive data samples in successive data frames in accordance with the present invention.

FIG. 7 illustrates adaptive bit modification with a fixed minimum dynamic range for successive data samples in successive data frames in accordance with the present invention.

The preserved dynamic range of the MSBs can be fixed, e.g., at 16 bits. N, the number of MSBs to be preserved, can be fixed as a preset parameter before processing (N may vary from 0 to the full dynamic range of the digitized samples). N=8 in the example shown.

The original waveform 110 indicates the dynamic range of each sample prior to scrambling. Region 720 designates the bits in each sample which are not modified, while a region 730 designates the bits in each sample which may be scrambled. For example, for FRAME A, bit15 (corresponding to a dynamic range of 16) and higher in each sample are not modified, while bit0 through bit 14 are modified. For FRAME B and FRAME C, all of the bits are modified, e.g., up to the dynamic range of each sample.

An advantage of this scheme is that there is no need to determine the dynamic range of each sample at the encoder and decoder.

The invention may be implemented with various other alternatives and enhancements, as follows.

1) For example, referring to FIG. 7, the number of MSBs to be preserved (N) can be dynamic, varying from frame to frame.

2) For video applications, scrambling can be done across video frames.

3) Amplitude range detect and mask generation (e.g., function 535 in FIG. 5, and function 650 in FIG. 6) can be a look-up-table with heuristic rules.

4) Scrambling frames can vary in length.

5) Horizontal scrambling can be done on any number of LSBs.

6) All or part of the scramble key can be hidden in the same frame, the previous frame, or any other frame of the content. The implementation hinges on the amount of buffer memory available and the throughput delay requirement.

7) Quiet, silent, or any other special passages can be left unscrambled. In other words, the scrambling can be continuous or discontinuous.

8) All or part of the scramble key for one stream of the content (e.g., video portion of a DVD disc) can be hidden in a different stream of the same content (e.g., the audio portion of the same DVD disc).

9) All or part of the scramble key can be hidden in any part of the same media (disc) in any form or fashion. For example, in the case of physical media such as CD or DVD, the key can be hidden electronically within sector data or physically with the use of techniques such as pit width modulation.

10) All or part of the scramble key for one stream of the content can be hidden in any separated media such as a pre-paid card. The key may also be a product of a transaction authorization via telephone, Internet, or any other communication means.

11) Scrambling can be done between two or more channels of the same data stream (e.g., front left and right channels of a multi-channel audio segment).

12) Multiple channels of the same content stream (e.g., front left and rear right channels of a multi-channel audio segment) can share the same scramble key or have different scramble keys.

13) Scrambling can be selectively done for selected channels of a multi-channel stream (e.g., front left and front right channels are scrambled but center, rear left, rear right and subwoofer channels are not).

14) Scramble Keys can be generated with either non-linear shift registers or non-linear feedback shift registers.

15) For contents in a compressed form, side information coded in the compressed stream, such as bit allocation information, can simplify the range detection process. However, for some frequency samples, there may not be enough bits allocated to clearly differentiate the sign bit, MSB, and the middle bits. If there are no middle bits, the partial scrambling can simply skip those frequency samples. All other operations described for uncompressed domain partial scrambling should apply.

After the partial scrambling, the modified frequency samples must be re-packaged to conform to the original bit stream format. This in most cases should not require re-quantization, just re-packetization. This process will be specific to the compression technique used. Some compression schemes may require variable length encoding, such as Huffman code, and specific measures must be taken if the size of the compressed bit stream must remain unchanged. Most compression schemes inherently produce variable length bit streams, and the subsequent transport stream format usually accommodates the change in the size of the bit stream.

One side benefit of applying the partial scrambling technique of the present invention to the compressed bit stream may be a slightly easier self synchronization at the decoder. This may occur since the frame structure or the packet structure present in the compressed bit stream format can make it easier for the decoder to determine the scrambling frame boundary.

Accordingly, it can be seen that the present invention provides a system for scrambling digital samples of multi-media data, including audio and video data samples, such that the content of the samples is degraded but still recognizable, or otherwise provided at a desired quality level. The quality level may be associated with a particular signal to noise ratio, or quality level that is determined by objective and/or subjective tests, for example. A number of LSBs can be scrambled in successive samples in successive frames. Moreover, the parameters for scrambling may change from frame to frame. Furthermore, the scrambling key can be embedded in the scrambled data and recovered at a decoder to descramble the scrambled samples. After descrambling, the scramble key is no longer recoverable because the scramble key is scrambled by the descrambler.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for protecting digital samples of content from illicit use by scrambling the content, wherein each sample includes a plurality of bits, ranging from least significant bits (LSBs) to most significant bits (MSBs), comprising the steps of:

determining a dynamic range defined by a most significant non-zero data bit of each sample; and adaptively selecting a number of LSBs to be scrambled in each sample according to the dynamic range determined therefor;

scrambling the selected number of LSBs in each sample according to a scrambling key, while preserving a number of MSBs in each sample, to provide corresponding scrambled samples; wherein:

the selected number of LSBs is scrambled in each sample such that the scrambled samples are degraded but still recognizable.

2. The method of claim 1, wherein the samples are provided in successive frames, comprising the further step of:
adaptively selecting the number of LSBs to be scrambled in each sample according to the frame thereof.

3. The method of claim 1, wherein:
said scrambling key is a pseudo-random scrambling key.

4. The method of claim 1, wherein:
in said scrambling step, the number of LSBs are scrambled within the same sample using intra-sample scrambling.

5. A method for protecting digital samples of content from illicit use by scrambling the content, wherein each sample includes a plurality of bits, ranging from least significant bits (LSBs) to most significant bits (MSBs), comprising the steps of:
determining a dynamic range defined by a most significant non-zero data bit of each sample; and
adaptively selecting a number of LSBs to be scrambled in each sample according to the dynamic range determined therefor;
scrambling the selected number of LSBs in each sample according to a scrambling key, while preserving a number of MSBs in each sample, to provide corresponding scrambled samples; wherein:
the selected number of LSBs is scrambled in each sample such that the scrambled samples are degraded but still recognizable; and
in said scrambling step, the selected number of LSBs are scrambled between different samples, and within the same sample, using inter-sample and intra-sample scrambling, respectively.

6. A method for protecting digital samples of content from illicit use by scrambling the content, wherein each sample includes a plurality of bits, ranging from least significant bits (LSBs) to most significant bits (MSBs), comprising the steps of:
determining a dynamic range defined by a most significant non-zero data bit of each sample; and
adaptively selecting a number of LSBs to be scrambled in each sample according to the dynamic range determined therefor;
scrambling the selected number of LSBs in each sample according to a scrambling key, while preserving a number of MSBs in each sample, to provide corresponding scrambled samples; wherein:
the selected number of LSBs is scrambled in each sample such that the scrambled samples are degraded but still recognizable; and
in said scrambling step, the selected number of LSBs are scrambled between different samples using horizontal inter-sample scrambling by interchanging bits having the same weight.

7. The method of claim 1, comprising the further step of:
embedding the scrambling key, at least in part, into the scrambled samples for use at a decoder in descrambling the scrambled samples.

8. The method of claim 7, wherein:
the scrambling key for a current frame of scrambled samples is embedded, at least in part, into a previous frame of samples.

9. The method of claim 7, wherein:
the scrambling key for a current frame of scrambled samples is embedded, at least in part, into a current frame of samples.

10. A method for descrambling previously scrambled digital samples of content, wherein each sample includes a plurality of bits, ranging from least significant bits (LSBs) to most significant bits (MSBs), comprising the steps of:
determining a dynamic range defined by a most significant non-zero data bit of each sample; and
adaptively selecting a number of LSBs to be descrambled in each sample according to the dynamic range determined therefor;
descrambling the selected number of LSBs in each sample according to a scrambling key, while preserving a number of MSBs in each sample, to provide corresponding descrambled samples; wherein:
the selected number of LSBs is scrambled in each sample such that the scrambled samples are degraded but still recognizable.

11. The method of claim 10, wherein the samples are provided in successive frames, comprising the further step of:
adaptively selecting the number of LSBs to be descrambled in each sample according to the frame thereof.

12. The method of claim 10, wherein:
said scrambling key is a pseudo-random scrambling key.

13. The method of claim 10, wherein:
in said descrambling step, the number of LSBs are descrambled within the same sample using intra-sample descrambling.

14. A method for descrambling previously scrambled digital samples of content, wherein each sample includes a plurality of bits, ranging from least significant bits (LSBs) to most significant bits (MSBs), comprising the steps of:
determining a dynamic range defined by a most significant non-zero data bit of each sample; and
adaptively selecting a number of LSBs to be descrambled in each sample according to the dynamic range determined therefor;
descrambling the selected number of LSBs in each sample according to a scrambling key, while preserving a number of MSBs in each sample, to provide corresponding descrambled samples; wherein:
the selected number of LSBs is scrambled in each sample such that the scrambled samples are degraded but still recognizable; and
in said descrambling step, the selected number of LSBs are descrambled between different samples, and within the same sample, using inter-sample and intra-sample descrambling, respectively.

15. A method for descrambling previously scrambled digital samples of content, wherein each sample includes a plurality of bits, ranging from least significant bits (LSBs) to most significant bits (MSBs), comprising the steps of:
determining a dynamic range defined by a most significant non-zero data bit of each sample; and
adaptively selecting a number of LSBs to be descrambled in each sample according to the dynamic range determined therefor;
descrambling the selected number of LSBs in each sample according to a scrambling key, while preserving a number of MSBs in each sample, to provide corresponding descrambled samples; wherein:

the selected number of LSBs is scrambled in each sample such that the scrambled samples are degraded but still recognizable; and in said descrambling step, the selected number of LSBs are descrambled between different samples using horizontal inter-sample descrambling by interchanging bits having the same weight.

16. The method of claim 10, wherein the scrambling key is embedded into the scrambled samples, comprising the further step of:

recovering the scrambling key from the scrambled samples for use in said descrambling step.

17. The method of claim 16, wherein:

the scrambling key for a current frame of scrambled samples is embedded into a previous frame of samples.

18. The method of claim 10, comprising the further steps of:

scrambling the scrambling key after descrambling the scrambled sample in said descrambling step.

19. An apparatus for protecting digital samples of content from illicit use by scrambling the content, wherein each sample includes a plurality of bits, ranging from least significant bits (LSBs) to most significant bits (MSBs), comprising:

a range detector/mask generator for determining a dynamic range defined by a most significant non-zero data bit of each sample and adaptively selecting a number of LSBs to be scrambled in each sample according to the dynamic range thereof;

a scrambler for scrambling the selected number of LSBs in each sample according to a scrambling key, while preserving a number of MSBs in each sample, to provide corresponding scrambled samples; wherein:

the selected number of LSBs is scrambled in each sample such that the scrambled samples are degraded but still recognizable.

20. An apparatus for descrambling previously scrambled digital samples of content, wherein each sample includes a plurality of bits, ranging from least significant bits (LSBs) to most significant bits (MSBs), comprising:

a range detector/mask generator for determining a dynamic range defined by a most significant non-zero data bit of each sample and adaptively selecting a number of LSBs to be descrambled in each sample according to the dynamic range thereof;

a descrambler for descrambling the selected number of LSBs in each sample according to a scrambling key, while preserving a number of MSBS in each sample, to provide corresponding descrambled samples; wherein:

the selected number of LSBs is scrambled in each sample such that the scrambled samples are degraded but still recognizable.

21. A method in accordance with claim 1, wherein:

in said scrambling step, the number of LSBs are scrambled between different samples using inter-sample scrambling.

22. A method in accordance with claim 10, wherein:

in said descrambling step, the number of LSBs are descrambled between different samples using inter-sample descrambling.

* * * * *